United States Patent Office 3,641,159
Patented Feb. 8, 1972

3,641,159
PROCESS FOR THE PREPARATION OF ORGANIC HALIDES AND ORGANIC ETHERS
Louis Schmerling, Riverside, Ill., assignor to Universal Oil Products Company, Des Plaines, Ill.
No Drawing. Filed Mar. 5, 1969, Ser. No. 804,695
Int. Cl. C07c 41/10, 17/16
U.S. Cl. 260—611 R
7 Claims

ABSTRACT OF THE DISCLOSURE

Organic halides and organic ethers are prepared by treating the corresponding alcohol with a mixture of two metal halide catalysts at conditions which include a temperature of from about 100° to about 250° C. and a pressure ranging from atmospheric to about 100 atmospheres.

This invention relates to a process for the formation of organic halides and organic ethers by treating alcoholic hydroxy compounds with a mixture of two metal halide catalysts, one of said catalysts possessing dehydration activity. More specifically, the invention is concerned with a process for treating an alcohol with two dissimilar metal halide catalysts at reaction conditions whereby the resulting compounds will comprise the corresponding halide and corresponding ether.

Organic halides and organic ethers will find a wide variety of usage in the chemical field. These compounds may be prepared from the corresponding alcohols which may be available in greater quantities and therefore may be easily converted to the desired compounds at a minimal expenditure, the aforementioned halides and ethers being in greater demand and less readily available than said alcohols. For example, n-butyl chloride may be utilized in organic syntheses, as an alkylating agent, or in the preparation of butyl cellulose, as a solvent or as an anthelmintic. Likewise, di-n-butyl ether may be used as a solvent for hydrocarbons or for fatty materials, as an extracting agent, a solvent purifier, or in other organic syntheses. Likewise, di-n-hexyl ether may be used in extraction processes, as well as in the manufacturing of collodion, photographic film and smokeless powder.

It is therefore an object of this invention to provide a process for preparing organic halides and organic ethers.

A further object of this invention is to provide a process for treating an alcoholic hydroxy compound with a mixture of two metal halides to prepare the corresponding halides and ethers.

In one aspect an embodiment of this invention is found in a process for the preparation of an organic halide and an organic ether which comprises treating an alcohol with a higher valent halide of a polyvalent metal and a metal halide which possesses dehydration activity at reaction conditions, and recovering the resultant organic halide and organic ether.

A specific embodiment of this invention is found in a process for the preparation of an organic halide and an organic ether which comprises treating 1-octanol with a mixture of cupric chloride and zinc chloride at a temperature in the range of from about 100° to about 250° C. and a pressure in the range of from about atmospheric to about 100 atmospheres, and recovering the resultant n-octyl chloride and di-n-octyl ether.

Other objects and embodiments will be found in the following further detailed description of the present invention.

As hereinbefore set forth, the present invention is concerned with a process for the formation of organic halides and organic ethers by treating an alcoholic hydroxy compound with a higher valent halide of a polyvalent metal and a metal halide possessing dehydration activity. Examples of hydroxy compounds which may be subjected to treatment of a type hereinafter set forth in greater detail will include in particular the aliphatic, alicyclic and aralkyl alcohols. In general, primary and secondary alcohols are preferred over tertiary alcohols which will often produce a high yield of by-products such as olefins. Specific examples of these compounds will include aliphatic alcohols containing from 1 up to about 20 carbon atoms such as methanol, ethanol, propanol, 1-butanol, sec-butyl alcohol, tert-butyl alcohol, 1-pentanol, sec-pentyl alcohols, tert-pentyl alcohol, the isomeric hexanols, heptanols, octanols, nonanols, decanols, undecanols, dodecanols, tridecanols, tetradecanols, pentadencanols, hexadecanols, heptadecanols, octadecanols, nonadecanols, eicosanols, etc.; cyclopentanol, cyclohexanol, cycloheptanol, 1-methylcyclopentanol, 2-methylcyclopentanol, 3-methylcyclopentanol, 4-methylcyclopentanol, 2-methylcyclohexanol, 3-methylcyclohexanol, 4-methylcyclohexanol, etc.; benzyl alcohol, 2-phenylethyl alcohol, 3-phenylpropyl alcohol, phenylbutyl alcohols, phenylpentyl alcohols, etc. It is also contemplated within the scope of this invention that alcohols containing relatively inert substituents such as 2-chloroethanol, 3 - chloropropanol, 4 - chlorobutanol, 5-chloropentanol, or phenols may also be treated with the mixture of the two metal halides, although not necessarily with equivalent results.

The reaction conditions under which the treatment of the alcohol with the mixture of metal halides is effected will depend upon the particular hydroxy-substituted compound which is to be treated and on the mixture of metal chlorides which are utilized. Generally speaking, the reaction will be effected at an elevated temperature in the range of from about 50° to about 250° C. and preferably in a range of from about 125° to about 200° C. In the preferred embodiment of the invention, the reaction is effected at atmospheric pressures and the reflux temperature of the alcohol. However, it is also contemplated that the reaction may be effected at elevated pressures ranging from about 2 to about 100 atmospheres when utilizing reaction temperatures which will lie in the upper portion of the temperature range hereinbefore set forth. When superatmospheric pressures are to be employed, the pressure may be autogenous or may be produced by charging a substantially inert gas such as nitrogen into the reaction zone, the amount of pressure used being that which is sufficient to maintain a major portion of the reactants in the liquid phase.

The catalysts which are employed to effect the conversion of the alcohol to the corresponding halides and ethers will comprise a mixture of metal halides. One of the components of the mixture comprises a higher valent halide of a polyvalent metal and is characterized as being a weak or totally inactive Friedel-Crafts type metal halide catalyst. Some specific examples of these higher valent halides of a polyvalent metal will include cupric chloride, cupric bromide, cupric fluoride, mercuric chloride, mercuric bromide, mercuric fluoride, stannic chloride, stannic bromide, stannic fluoride, cobaltic chloride, cobaltic bromide, cobaltic fluoride, molybdenum trichloride, molybdenum tribromide, molybdenum trifluoride, molybdenum tetrachloride, molybdenum tetrabromide, molybdenum tetrafluoride, molybdenum pentachloride, molybdenum pentabromide, molybdenum pentafluoride, manganese trichloride, manganese tribromide, manganese trifluoride, chromic chloride, chromic bromide, chromic fluoride, etc. The other component of the catalyst mixture will comprise a metal halide which possesses dehydration activity, a preferred halide comprising zinc chloride.

The process of this invention may be effected in any suitable manner and may comprise either a batch or continuous type operation. For example, when a batch type operation is used, the alcoholic hydroxy compound which is to undergo treatment is placed in an appropriate apparatus along with the dissimilar metal halides of the type hereinbefore set forth in greater detail. If the reaction is to be effected at atmospheric pressure, the reaction vessel will comprise a flask which is provided with heating, stirring and reflux means. However, if the reaction is to be effected at temperatures within the upper limit of the range hereinbefore set forth in greater detail, the apparatus which will be used will be of the type in which superatmospheric pressures may be employed, examples of this type of apparatus being a mixing or stirring autoclave. The reaction mixture is then heated to the desired operating temperature which, if atmospheric pressures are used, will usually be the reflux temperature of the alcoholic hydroxy compound and allowed to proceed for a predetermined residence time, said residence time being from about 0.5 up to about 10 hours or more in duration. If superatmospheric pressures are to be employed, the necessary pressure can be generated by the introduction of a substantially inert gas such as nitrogen into the reaction vessel, said operating pressure being that which is necessary to maintain a major portion of the reactants in the liquid phase. Upon completion of the desired residence time, heating is discontinued and the mixture allowed to return to room temperature. The reaction mixture is recovered, separated from the catalyst and subjected to fractional means for purification and recovery, said means including washing, drying, fractional distillation, etc.

It is also contemplated that the process of the present invention may be effected in a continual manner of operation. When such a type of operation is used, the alcoholic hydroxy compound is continuously charged to a reaction zone which contains the mixture of metal halides, said reaction zone being maintained at the proper operating conditions of temperature and pressure. Inasmuch as the metal halide catalysts are solid in nature, one particular type of operation which may be used comprises the fixed bed type in which the alcoholic hydroxy compound is passed either upwardly or downwardly over a fixed bed of the catalyst which is maintained in the reaction zone. Another type of operation which may be used comprises the moving bed type of operation in which the catalyst and reactant pass either concurrently or countercurrently to each other through the reaction zone. In addition, a third type of operation may be used in which the catalyst mixture is carried into the reaction zone as a slurry or solution in the alcoholic hydroxy compound. After maintaining the alcoholic hydroxy compound in the reaction zone for a predetermined period of time, the reactor effluent is continuously withdrawn from the zone, the unreacted alcoholic hydroxy compound is separated from the desired product and recycled to form a portion of the feed stock. The reaction product is then subjected to conventional means of purification and recovery.

The following examples are given to illustrate the process if the present invention which, however, are not intended to limit the generally broad scope of the present invention in strict accordance therewith.

EXAMPLE I

In this example, a mixture of 92 grams (0.71 mole) of 1-octanol, 36 grams (0.27 mole) of cupric chloride and 18 grams (0.13 mole) of zinc chloride, was weighed into a 500 mole glass flask and boiled under reflux for a period of 3 hours, during which the temperature dropped from 140° C. to 131° C. At the end of this time, heating was discontinued and the product was allowed to return to room temperature. The cooled liquid was separated from the catalyst by filtration and analyzed. It was found to consist of n-octyl chloride (32 mol percent yield) and di-n-octyl ether (22 mol percent yield) with a relatively small amount of octenes (4 mol percent yield) being present. The yields were based on the 1-octanol charged; 25 mol percent was recovered.

EXAMPLE II

In this experiment, 81 grams (0.62 mole) of 1-octanol, along with 34 grams (0.25 mole) of cupric chloride and 13.5 grams (0.10 mole) of zinc chloride were placed in the glass liner of a rotating autoclave. The autoclave was sealed, pressured with 30 atmospheres nitrogen and heated to a temperature of 200° C., being maintained at this temperature for a period of 4 hours. At the end of this time, heating was discontinued and the autoclave was sealed, pressured with 30 atmospheres nitrogen and heated to a temperature of 200° C., being maintained at this temperature for a period of 4 hours. At the end of this time, heating was discontinued and the autoclave allowed to return to room temperature. The reaction mixture was recovered and the liquid product was separated from the catalyst by means of filtration, following which the product was analyzed by means of GLC (gas-liquid chromatography). The product was found to contain a major portion of n-octyl chloride (26 mol percent yield) and di-n-octyl ether (30 mol percent yield) together with a 29 mol percent yield of octenes, formation of which showed that the reaction conditions of Example I were preferable. There was also formed sec-octyl chlorides in an 8 mol percent yield.

EXAMPLE III

To illustrate the necessity for having a catalyst comprising dissimilar metal halides, one being a higher valent halide of a polyvalent metal and the other a metal halide possessing dhydration activity, the experiment of Example I above was twice repeated. However, in the first repeat experiment the 1-octanol was treated at reflux conditions (154°–142° C.) with cupric chloride alone. The results disclosed that relatively lower yields of n-octyl chlorides (12 mol percent) and di-octyl ether (10 mol percent) were obtained. Most (76%) of the n-octanol was recovered unchanged.

Refluxing the 1-octanol under the identical conditions utilizing zinc chloride alone gave a very minor yield of octyl ether (2 mol percent) and no octyl chloride. Over 97% of the 1-octanol was recovered.

EXAMPLE IV

In this example 81 grams (1.35 mole) of 1-propanol along with 45.4 grams (0.34 mole) of cupric chloride and 12.3 grams (0.09 mole) of zinc chloride were placed in the glass liner of a rotating autoclave. The autoclave was sealed and heated to a temperature of 200° C., being thereat for a period of 4 hours. At the end of this time, heating was discontinued and the autoclave allowed to return to room temperature. The reaction mixture was recovered and the liquid product was separated from the catalyst by means of filtration and subjected to gas-liquid chromatographic analysis. This analysis disclosed the presence of a major portion of n-propyl chloride and di-n-propyl ether along with smaller amounts of isopropyl chloride and propylene.

EXAMPLE V

A mixture of 85 grams (1.80 moles) of tert-pentyl alcohol, 35 grams (0.35 mole) of cupric chloride, and 21 grams (0.21 mole) of zinc chloride was heated under reflux for a period of 2 hours, during which time the temperature of the reaction dropped from 75° to 48° C. The liquid product was decanted from the catalyst and distilled. The chief components of the product were found to comprise 2-methyl-2-butene and tert-pentyl chloride.

EXAMPLE VI

In this example 74 grams (1.0 mole) of 1-butanol along with 44 grams (0.33 mole) of cupric chloride and 13.5 grams (0.1 mole) of zinc chloride are placed in the glass liner of a rotating autoclave. The autoclave is sealed, nitrogen is pressed in until an initial pressure of 25 atmospheres is reached and thereafter the autoclave is heated to a temperature of about 200° C. The autoclave is maintained at this temperature for a period of 4 hours, after which heating is discontinued and the autoclave allowed to return to room temperature. The excess pressure is vented, the autoclave is opened, and the reaction product is rcovered. The product is separated from the catalyst and subjected to analysis of the type hereinbefore set forth, said analysis disclosing the presence of a major portion of n-butyl chloride and di-n-butyl ether along with lesser amounts of sec-butyl chloride and butenes.

EXAMPLE VII

A mixture of 71 grams (0.75 mole) of cyclopentanol, 40 grams (0.30 mole) of cupric chloride and 12 grams (0.09 mole) of zinc chloride is placed in a reaction vessel provided with heating, stirring, and condenser means. The mixture is then heated to the reflux temperature and maintained thereat for a period of about 2 hours. At the end of this time, heating is discontinued, the flask is allowed to return to room temperature and the reaction product is separated from the catalyst by filtration. Analysis of the product will disclose the presence of a major portion of cyclopentyl chloride and dicyclopentyl ether.

EXAMPLE VIII

A mixture comprising 79 grams (0.8 mole) of cyclohexanol, 33 grams (0.25 mole) of cupric chloride and 16 grams (0.12 mole) of zinc chloride is treated in a manner similar to that set forth in Example II above. Upon completion of the desired residence time, the reaction product is recovered and separated from the catalyst. Analysis of the product will disclose the presence of a major portion of cyclohexyl chloride and dicyclohexyl ether.

EXAMPLE IX

Results which are similar to those found in Example I above are obtained when 1-octanol is heated under reflux with a mixture of mercuric chloride and zinc chloride.

I claim as my invention:

1. A process for the preparation of an organic chloride and an organic ether which comprises treating an alcohol selected from the group consisting of alkanols containing up to about 20 carbon atoms, cycloalkanols having 5 to 7 carbon atoms in the ring and phenyl substituted lower alkanols, at a temperature of about 50° to 250° C. and a pressure of about 1 to 100 atmospheres, with zinc chloride and a higher valent chloride of a polyvalent metal selected from the group consisting of copper, mercury, tin, cobalt, molybdenum, manganese and chromium, and recovering the resultant organic chloride and organic ether.

2. The process as set forth in claim 1 in which said higher valent chloride of a polyvalent metal is cupric chloride.

3. The process as set forth in claim 1 in which said alcohol is 1-octanol, said organic chloride is n-octyl chloride, and said organic ether is di-n-octyl ether.

4. The process as set forth in claim 1 in which said alcohol is 1-propanol, said organic chloride is n-propyl chloride, and said organic ether is di-n-propyl ether.

5. The process as set forth in claim 1 in which said alcohol is 1-butanol, said organic chloride is n-butyl chloride, and said organic ether is di-n-butyl ether.

6. The process as set forth in claim 1 in which said alcohol is cyclopentanol, said organic chloride is cyclopentyl chloride, and said organic ether is dicyclopentyl ether.

7. The process as set forth in claim 1 in which said alcohol is cyclohexanol, said organic chloride is cyclohexyl chloride, and said organic ether is dicyclohexyl ether.

References Cited

UNITED STATES PATENTS 2,328,059  8/1943  Craig _____ 260—614
2,332,467  10/1943  Linn et al. _____ 260—614

OTHER REFERENCES

Clark et al., Trans. of the Royal Soc. of Canada; sec. III (1929), pp. 77–87.

Racousine, Bull. Soc. Chim., vol. 49 (1931), pp. 1585–1590.

BERNARD HELFIN, Primary Examiner

U.S. Cl. X.R.

260—611 A, 614 R, 652 R